(12) United States Patent
Yong

(10) Patent No.: US 7,035,523 B2
(45) Date of Patent: Apr. 25, 2006

(54) INEXPENSIVE FIBER OPTIC ATTENUATION

(75) Inventor: Edward G. Yong, Sioux City, IA (US)

(73) Assignee: Gateway Inc., Irvine, CA (US)

( * ) Notice: Subject to any disclaimer, the term of this patent is extended or adjusted under 35 U.S.C. 154(b) by 136 days.

(21) Appl. No.: 10/326,230

(22) Filed: Dec. 20, 2002

(65) Prior Publication Data

US 2003/0138234 A1 Jul. 24, 2003

Related U.S. Application Data

(63) Continuation-in-part of application No. 10/201,169, filed on Jul. 22, 2002, and a continuation-in-part of application No. 10/314,631, filed on Dec. 9, 2002.

(60) Provisional application No. 60/340,118, filed on Dec. 10, 2001, provisional application No. 60/344,847, filed on Dec. 31, 2001, provisional application No. 60/344,848, filed on Dec. 31, 2001, provisional application No. 60/358,577, filed on Feb. 21, 2002.

(51) Int. Cl.
*G02B 6/00* (2006.01)

(52) U.S. Cl. ....................... 385/140; 385/134

(58) Field of Classification Search ............... 385/140, 385/134, 52, 77, 136
See application file for complete search history.

(56) References Cited

U.S. PATENT DOCUMENTS

| | | | | |
|---|---|---|---|---|
| 4,145,199 A * | 3/1979 | Russell | ........................ | 65/438 |
| 4,408,825 A * | 10/1983 | Stelmack | .................... | 359/360 |
| 4,436,995 A * | 3/1984 | Whitten | .................. | 250/227.16 |
| 4,459,477 A * | 7/1984 | Asawa et al. | .......... | 250/227.16 |
| 4,463,254 A * | 7/1984 | Asawa et al. | .......... | 250/227.16 |
| 4,477,725 A * | 10/1984 | Asawa et al. | .......... | 250/227.16 |
| 4,678,903 A * | 7/1987 | Wlodarczyk et al. | .. | 250/227.14 |
| 4,822,125 A * | 4/1989 | Beals et al. | .................... | 385/48 |
| 4,930,862 A * | 6/1990 | Miers et al. | .................. | 385/13 |
| 5,684,912 A * | 11/1997 | Slaney et al. | ............... | 385/140 |
| 6,208,798 B1 | 3/2001 | Morozov et al. | | |
| 6,275,643 B1 | 8/2001 | Bandy et al. | | |
| 6,301,426 B1 | 10/2001 | Jameson et al. | | |
| 6,321,017 B1 | 11/2001 | Janus et al. | | |
| 6,332,055 B1 | 12/2001 | Hatayama et al. | | |
| 6,335,998 B1 | 1/2002 | Wagoner et al. | | |

OTHER PUBLICATIONS

Website: http://www.moec.com/products/php.

* cited by examiner

*Primary Examiner*—Kaveh Kianni
(74) *Attorney, Agent, or Firm*—Robert F. Zielinski; Wolf, Block, Schorr Solis-Cohen

(57) ABSTRACT

An attenuator for fiber optic cable has a device for receiving a length of the cable. A series of attenuation structures is defined on the device, the attenuation structures being located proximate to each other. Each of the attenuation structures is adapted to bend the cable through a corresponding arc to alter the path of the fiber optic cable so that a signal traveling through the fiber optic cable is attenuated. Additionally, the attenuation structures are individually accessible to select a desired amount of attenuation.

6 Claims, 3 Drawing Sheets

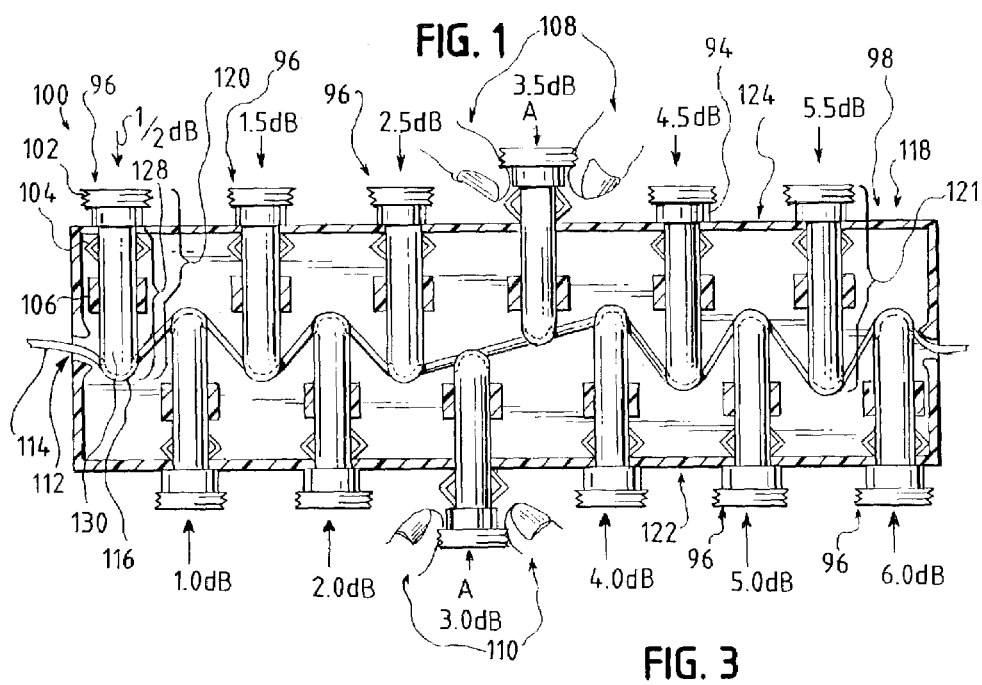
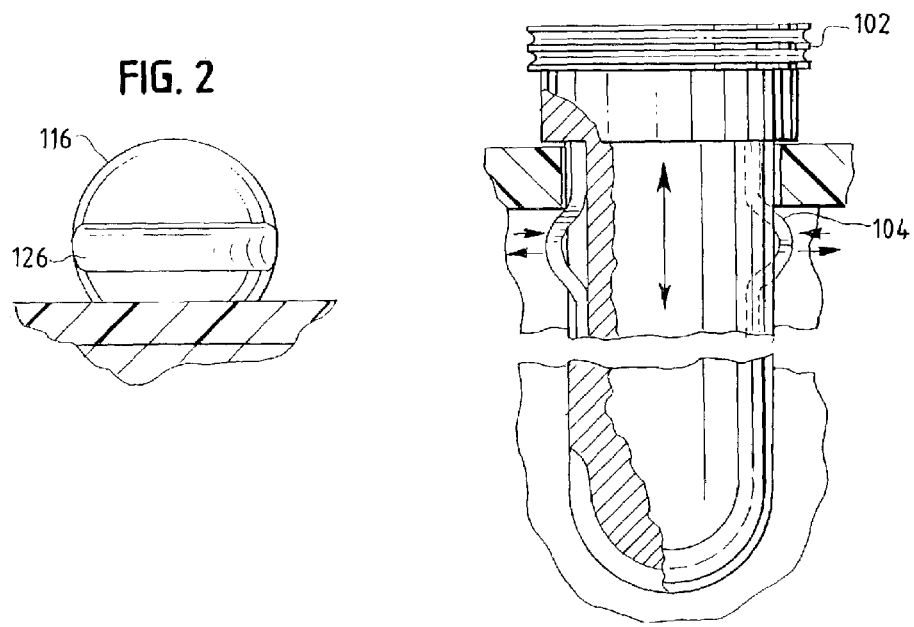

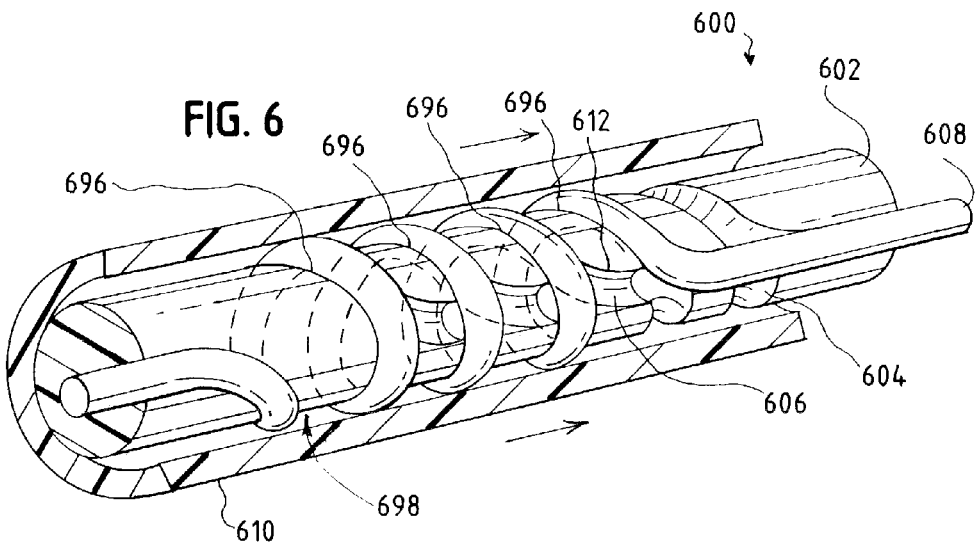
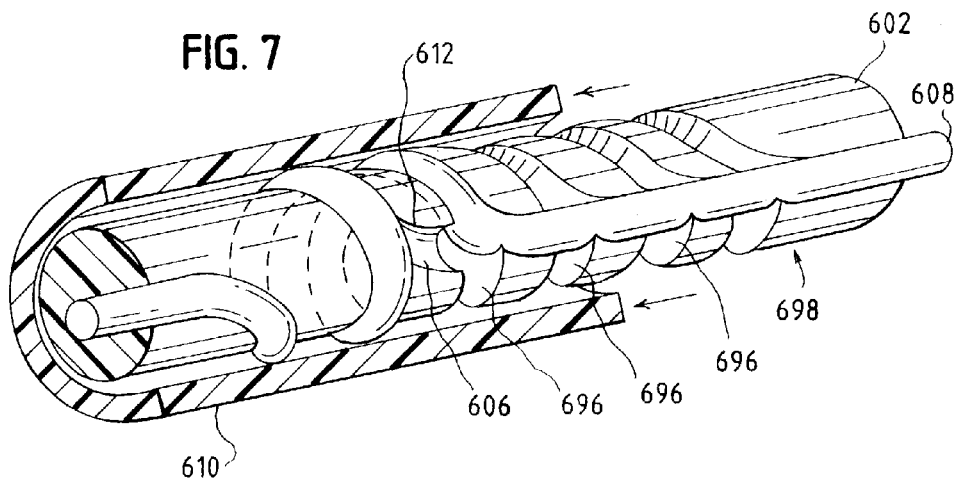

INEXPENSIVE FIBER OPTIC ATTENUATION

This application claims benefit of 60/344,847 Dec. 31, 2001, and claims benefit of 60/358,577 Feb. 21, 2002 and claims benefit of 60/344,848 Dec. 31, 2001 and is a CIP of Ser. No. 10/201,169 Jul. 22, 2002 and is a CIP of Ser. No. 10/314,631 Dec. 9, 2002 which claims benefit of 60/340,118 Dec. 10, 2001.

FIELD OF THE INVENTION

This invention relates to fiber optic attenuators.

BACKGROUND

Modern information networks having optical interconnects utilize variable fiber optic attenuators. For example, in wave division multiplex optical networks having increased wavelength content and greater functionalities, optical communication channels may be added, dropped, and/or rerouted to any node of the network. As a result of this flexibility, the network is more complex from an optical content point of view. It is important to carefully monitor the optical power and individual wavelengths channeled as a result. Otherwise, high error rates may occur during propagation through communication channels having optical amplifiers (add-drop modules, multiplexers/demultiplexers, and other optical signal condition components). Consequently, inexpensive, reliable devices to adjust the power level of the applicable signals for higher accuracy and higher repeatability are needed.

In general, optical communication systems include several optical fiber-coupled devices (e.g., light sources, photodetectors, switches, attenuators, amplifiers, and filters). In the optical communications systems, the optical fiber-coupled devices transmit optical signals. Some optical signals that are transmitted in the optical communications systems have varying wavelengths or frequencies. The optical signals' different wavelengths transmit digital or analog data.

Several optical communication systems are lossy, i.e., the optical fibers used therein scatter or absorb portions of the optical signals transmitted therealong (about 0.1–0.2 dB/km). The power associated with the optical signals is reduced when portions of the optical signals transmitted on the optical fibers are scattered or absorbed. Positioning amplifiers in the optical communication system compensates for power reductions attributable to the optical fibers. By utilizing optical amplifiers, the power of the optical signals transmitted along the optical fibers increases.

Power variations between the different wavelengths of the optical signals may occur after the optical signals propagating along the optical fiber experience multiple cycles of power losses followed by amplification. If uncorrected, these power variations may cause adjacent wavelengths to interfere with each other, resulting in transmission errors.

When using fiber optic systems, specific control of optical signal levels entering various system components is often required. In general, optical attenuators are used to control the power variations between the different optical signal wavelengths in optical communication systems. For example, one method of controlling the optical signal levels is to use an attenuator. An adjustable attenuator allows the desired level of attenuation to be set and remain stable with time, temperature, etc. Some optical attenuators control the power variations between the different optical signal wavelengths by reflecting portions of specified optical signal wavelengths provided thereto.

Many optical attenuators include a plate attached to a substrate with torsional members, e.g., rods, springs. The plate is coated with a reflective material. By applying a torque to the torsional members, the plate is moveable relative to the substrate. The movement of the plate attenuates optical signals provided thereto by reflecting portions thereof away from the transmission path of the optical communication system.

One problem with optical attenuators that include reflective plates relates to their insertion loss. Optical attenuators, in an "off" state, typically reflect optical signals with near zero attenuation. Near zero attenuation in the "off" state requires that the reflective plates have very flat surfaces. Reflective plates with very flat surfaces are difficult to fabricate.

Also, near zero attenuation in the "off" state requires that the plane of the reflective plate be positioned parallel to the substrate. However, for a torsional plate structure, the torsional members are fragile such that the equilibrium rotation of the reflective plate potentially drifts after each "on/off" cycle. Such drifting of the reflective plate affects its position plate relative to the substrate.

Controlling the optical signal levels entering various system components is important to prevent transmission errors. This is especially true in short distance runs, where more loss of the signal is needed to prevent transmission errors.

Thus, optical attenuators continue to be sought.

SUMMARY OF THE INVENTION

An attenuator for fiber optic cable includes a device for receiving a length of fiber optic cable. A series of attenuation structures are defined on the device and are located proximate to each other. Each of the attenuation structures is adapted to bend the cable through a corresponding arc to alter the path of the fiber optic cable so that a signal traveling through the fiber optic cable is attenuated.

In one version, the attenuation structures are individually accessible to select a desired amount of attenuation. In another version, the attenuator has a housing adapted to enclose a portion of the fiber optic cable. Extending inside and outside of the housing are a plurality of mechanisms moveably mounted to the housing. The mechanisms are moveable between a first, disengaged position and a second position engaging the fiber optic cable at a corresponding location thereon. The second position bends the fiber optic cable through a corresponding arc to alter the path of the fiber optic cable so that a signal traveling through the fiber optic cable is attenuated, but it does not cause the bending of the cable to exceed the cable's bend radius.

In still another embodiment, an attenuator has a grooved cylinder wherein the groove comprises a spiral and is sized to receive a fiber optic cable. A means for securing the fiber optic cable to the grooved cylinder is provided.

BRIEF DESCRIPTION OF THE DRAWINGS

FIG. 1 is a side sectional view of one of the preferred embodiments of the invention with a fiber optic cable in place.

FIG. 2 is an enlarged end view of one of plungers of the embodiment of FIG. 1.

FIG. 3 is an enlarged, side elevational view of the plunger of FIG. 2.

FIGS. 6 and 7 are perspective views of another alternative embodiment of the invention.

DESCRIPTION OF THE PREFERRED EMBODIMENTS

Figure 4:
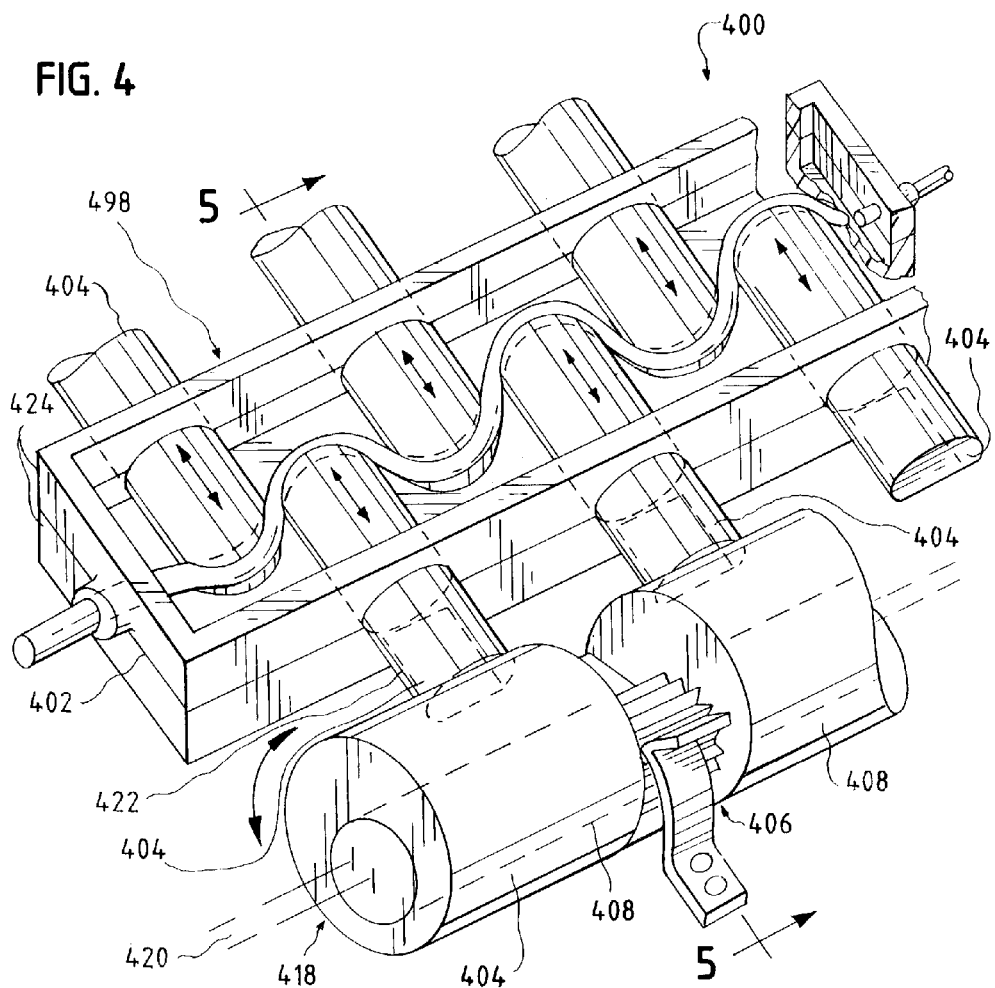
FIG. 4 is a perspective view of an alternative embodiment of the invention.

While the specification concludes with claims particularly pointing out and distinctly claiming the subject matter which is regarded as the invention, the invention will now be further described by reference to the following detailed description of preferred embodiments taken in conjunction with the above-described accompanying drawings.

Referring generally to the embodiment shown in FIGS. 1–3, attenuator 100 includes a device 98 for receiving a length of fiber optic cable 114. Device 98, in turn, includes a series of attenuation structures 96 formed or defined thereon and located proximate to each other. Each of the attenuation structures 96 is adapted to bend fiber optic cable 114 through a corresponding arc to alter its path so that a signal traveling through fiber optic cable 114 is attenuated. Attenuation structures 96 are individually accessible to select a desired amount of attenuation.

In the embodiment shown in FIG. 1, attenuator 100 includes a housing 118 with opposite walls 122, 124, which housing 118 is adapted to enclose a portion of fiber optic cable 114.

Attenuation structures 96 comprise a plurality of mechanisms 120 which are mounted to housing 118 and movable between a first, disengaged position and a second, engaged position. Mechanisms 120 are preferably slidable individually from the first, disengaged position to the second, engaged position by pushing individual mechanisms 120 toward housing 118 in the directions shown by arrows A (shown for two of the mechanisms 120). Mechanisms 120 include heads 116 positioned at the ends of the mechanisms 120 to engage fiber optic cable 114. Head 116 optionally includes additional means to retain cable 114 in position, here shown as groove 126 (FIG. 2).

When moved to the second, engaged position, mechanism 120 bends the fiber optic cable 114 through a corresponding arc to alter the path of fiber optic cable 114. The arc imposed on cable 114 attenuates the signal traveling through the fiber optic cable.

Mechanism 120 is sized relative to cable 114 and mounted to housing 118 so that, when in the second, engaged position, mechanism 120 does not bend cable 114 beyond the cable's associated bend radius. In particular, base 102 of mechanism 120 optionally includes a flange 94 located to oppose housing 118 and thereby limit the distance through which mechanism 120 may be advanced inside of housing 118. In addition, radius of head 116 is preferably selected to be less than the bend radius of cable 114.

Detent, catch, or ratchet 104 locks mechanism 120 in its second position after mechanism 120 has been suitably pushed inside of housing 118. Guides 106 optionally allow mechanisms 120 to slide relative to housing 118 in predetermined paths perpendicular to opposite walls 120, 122. Guides 106 and mechanisms 120 may also be structured to engage each other in such a way to keep mechanisms 120 from being pulled completely out of housing 118 and thus separated from the unit.

Head 116 of mechanism 120 is preferably rounded, as shown in FIG. 3, having a suitable radius selected to bend that portion of the fiber optic cable engaged by head 116 within the allowable bend radius. Groove 118 is defined in bend 116 to have a width sufficient to receive the fiber optic cable 114 and is likewise provided with a radius suitable to receive cable 114 within the allowable bend radius. The groove is optionally shaped to engage cable 114 in a friction fit. Thus, head 116 includes a structure to retain the fiber optic cable 114 in engagement therewith. Alternate structures, not limited to a groove, can likewise be used to retain the fiber optic cable 114 in engagement with head 116.

Mechanisms 120 are mounted along opposite walls 122, 124 at alternating locations to define corresponding, alternating bends in fiber optic cable 114. Mechanisms 120 are sized and mounted to cause each of the bends of the fiber optic cable to extend through an arc of 180° when mechanisms 120 are in their second, advanced positions. It has been found that a 180° arc generally attenuates the signal by ½ dB. Preferably, attenuator 100 comprises twelve, independently actuatable mechanisms 120. As such, attenuator 120 is able to attenuate a signal flowing through fiber optic cable 114 by an amount ranging from ½ dB to 6 dB by moving a corresponding number of mechanisms 120 to the second, engaged position.

Mechanism 120 preferably comprises plungers 121 with respective stems 128. The stems 128 of mechanism 120 have outer portions 102 extending outwardly from housing 118 and inner portions 130 extending into the housing and secured to respective heads 116. When mechanisms 120 are moved, stems 128 slide in corresponding bores in housing 118.

The interior of housing 118 is accessed preferably by having housing 118 separate along a suitable plane, such as in a clamshell fashion. For example, housing 118 shown in the embodiment of FIG. 4 separates along boundary 402. Alternate approaches to accessing the interior of housing 118 are also suitable, such as by separating the two portions 120, 122 of housing 118 (FIG. 1) along a plane corresponding to openings 112 at the ends of the housing. In whatever manner housing 118 is opened, once opened, fiber optic cable 114 is placed inside of housing 118. The cable 114 enters and exits housing 118 through holes 112.

Figure 5:
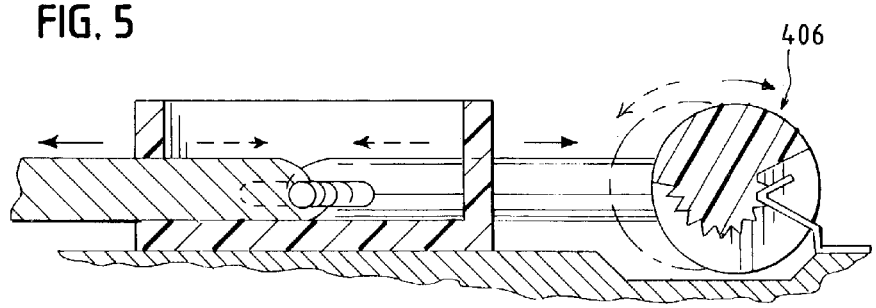
FIG. 5 is a cross-sectional side view along line 5—5 of the embodiment shown in FIG. 4.

Referring now to FIGS. 4–5, attenuator 400 has a device 498 similar to device 98 of the embodiment of FIGS. 1–3; however, attenuator 400 includes a cam system 406 for actuating multiple mechanisms 404 by a single operation. Cam system 406 makes use of two sets 418 of rotatable cams 408, one set mounted proximate to one side of device 498 and a second set (not shown) mounted proximate to the opposite side of device 498. For each set 418, cams 408 are mounted to shaft 420 to rotate together in the directions of arrows B, to engage the opposing ends 422 of mechanisms 404 and advance them toward housing 424. System 406 contains a locking device which prevents mechanisms 404 from sliding or moving out of position. When such a system is implemented, mechanisms 404 can have either a first and second position, or, alternatively, they may be moved gradiantly by appropriate rotation of cams 408.

Another alternative embodiment of the invention is depicted in FIGS. 6 and 7. Referring generally to FIGS. 6–7, attenuator 600 includes a device 698 for receiving a length of fiber optic cable 608. Device 698, in turn, includes a series of attenuation structures 696 formed or defined thereon and located proximate to each other. As with the previous embodiments, each of the attenuation structures 696 is adapted to bend fiber optic cable 608 through a corresponding arc to alter its path so that a signal traveling through fiber optic cable 608 is attenuated. Attenuation structures 696 are individually accessible to select a desired amount of attenuation.

In this embodiment, device 698 is in the form of a cylinder 602, and the attenuation structures 696 are in the form of a spiral groove 604 defined around cylinder 602 and sized to receive fiber optic cable 608. Otherwise stated, each 360- or 180-degree arc or "winding" of spiral groove 604 comprises one of the attenuation structures 696 in this embodiment. Attenuation is achieved by wrapping fiber optic cable 608 around cylinder 602 in spiral groove 604 a selected number of times.

Means for securing the fiber optic cable 608 to the grooved cylinder 602 is also provided, here shown as sleeve or wrap 610, although alternate means are suitable to perform this function. The sleeve or wrap 610 is removably secured to cylinder 602 by any suitable means, such as, but not limited to, Velcro®, a rubber sheath, or adhesive tape.

Cylinder 602 includes a longitudinal groove 606 running perpendicular to and between the spirals of groove 604. Once the desired amount of attenuation is achieved, cable 608 is placed into longitudinal groove 606 and extended out the end of cylinder 602.

Wrapping fiber optic cable 608 into spiral groove 604 around cylinder 602 bends cable 608 through a predetermined arc. Because of the bending or spiraling of the cable 608, the signal flowing through cable 608 is attenuated. Thus, varying the number of winds of the cable in groove 604 varies the amount of attenuation and attenuation in the range of ½ dB to 6 dB can easily be achieved. In view of this, the signal flowing through the fiber optic cable 608 is attenuated more in FIG. 6 than in FIG. 7 because fiber optic cable 608 in FIG. 6 is wrapped more times around cylinder 602.

Grooves 604, 606 have widths sufficient to receive fiber optic cable 602 therein. Cylinder 602 is made out of any material suitable for the purposes described above, one such material being a resiliently compressible, polymeric material.

Groove 604 and longitudinal groove 606 may themselves be configured to secure cable 608 to cylinder 602. For example, the outer edge of grooves 604, 606 may include a lip 612 of resiliently compressible material. Lip 612 is deflected upon insertion of cable into grooves 604, 606, and returns to at least partly "cover" grooves 604, 606 to retain cable 608 therein.

In addition to the advantages apparent from the foregoing description, the attenuator of the present invention is structured so that the fiber optic cable does not have to be cut in order to attenuate the signal flowing therethrough.

As another advantage, an input or an output does not have to be connected to the fiber optic attenuator.

As still another advantage, it is not necessary to interpose a device in the signal path of the fiber optic cable; rather, the cable remains uninterrupted in the present invention.

Additional advantages and variations will be apparent to those skilled in the art, and those variations, as well as others which skill or fancy may suggest, are intended to be within the scope of the present invention, along with equivalents thereto, the invention being defined by the claims attended hereto.

What is claimed is:

1. An attenuator for fiber optic cable comprising:
   a device for receiving a length of the cable;
   a series of attenuation structures defined on the device and located proximate to each other;
   each of the attenuation structures adapted to bend the cable through a corresponding arc to alter the path of said fiber optic cable so that a signal traveling through the fiber optic cable is attenuated, the attenuation structures being individually accessible to select a desired amount of the attenuation, wherein the series of attenuation structures is sufficient to attenuate the signal by any selected amount in the range of ½ dB to 6 dB.

2. The attenuator of claim 1, wherein the attenuation structures comprise mechanisms moveably mounted to the device, the mechanisms being moveable between a first, disengaged position and a second position engaging the fiber optic cable at a corresponding location thereon, the second position bending the fiber optic cable through the corresponding arc, the mechanisms sized and mounted so that, in the second position, the engagement of the cable does not cause the bending of the cable to exceed the bend radius of the cable.

3. The attenuator of claim 1, wherein the attenuation structures comprise a groove comprising a spiral and sized to receive a fiber optic cable therein.

4. An attenuator for fiber optic cable comprising:
   a device for receiving a length of the cable;
   a series of attenuation structures defined on the device and located proximate to each other;
   each of the attenuation structures adapted to bend the cable through a corresponding arc to alter the path of said fiber optic cable so that a signal traveling through the fiber optic cable is attenuated, the attenuation structures being individually accessible to select a desired amount of the attenuation, wherein the attenuation structures comprise a groove comprising a spiral and sized to receive a fiber optic cable therein.

5. The attenuator of claim 4, wherein the series of attenuation structures is sufficient to attenuate the signal by any selected amount in the range of ½ dB to 6 dB.

6. The attenuator of claim 4, wherein the attenuation structures comprise mechanisms moveably mounted to the device, the mechanisms being moveable between a first, disengaged position and a second position engaging the fiber optic cable at a corresponding location thereon, the second position bending the fiber optic cable through the corresponding arc, the mechanisms sized and mounted so that, in the second position, the engagement of the cable does not cause the bending of the cable to exceed the bend radius of the cable.

* * * * *